ent Office 3,374,220
Patented Mar. 19, 1968

3,374,220
PYRIDAZINE MONOAZO DYESTUFFS
Gilbert Victor Henri Kremer, Ermont, and Robert Frederic Michel Sureau, Enghien-les-Bains, France, assignors to Etablissements Kuhlmann, Paris, France
No Drawing. Filed Feb. 24, 1965, Ser. No. 435,045
Claims priority, application France, Feb. 28, 1964, 965,493
3 Claims. (Cl. 260—154)

ABSTRACT OF THE DISCLOSURE

Dyestuffs having one of the general formulae:

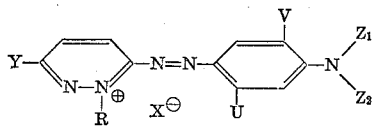

and

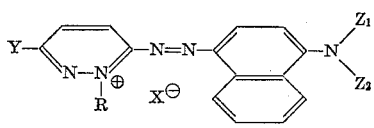

in which Y represents a member selected from the group consisting of chlorine, and bromine atoms, the phenoxy group and alkoxy groups having up to 3 carbon atoms, R is a member selected from the group consisting of the methyl and ethyl groups, $X^{\ominus}$ represents a monovalent anion, $Z_1$ and $Z_2$ each represents a member selected from the group consisting of the hydrogen atom and the methyl and ethyl groups, U represents a member selected from the group consisting of the hydrogen atom and the methyl, methoxy, ethoxy and acetylamino groups, and V represents a member selected from the group consisting of the hydrogen atom and the methoxy and ethoxy groups.

---

The present invention concerns improvements in and relating to pyridazine dyestuffs.

According to the present invention dyestuffs are provided which are represented by the general formula:

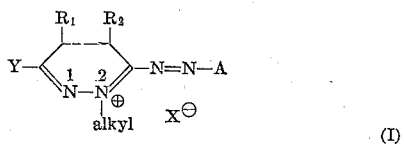

in which A represents the residue of a coupling compound AH, Y represents a chlorine or bromine atom of an alkoxy, phenoxy, alkylthio, mono- or di-alkylamino, arylamino, arylalkylamino or acylamino group, $R_1$ and $R_2$ represent hydrogen atoms or alkyl groups and X represents a mono-valent anion.

The alkyl group in the 2 position is preferably a methyl or ethyl group.

The invention also includes a 2-alkyl-3-pyridazone-hydrazones of the formula:

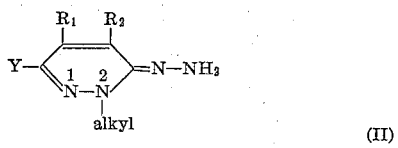

in which $R_1$, $R_2$ and Y have the significance indicated above.

Dyestuffs of Formula I may be prepared, for example, by coupling a compound of formula AH, in the presence of an oxidising agent, with a hydrazone of Formula II.

Among the coupling compounds AH which may be used there may be mentioned more particularly mono- or di-alkylated anilines possibly substituted apart from the 4 position by alkyl, alkoxy or acylamino groups, α-naphthylamine or its N-mono- or di-alkyl derivatives, phenol or its alkyl derivatives, naphthols, N-(acyl-acetyl)-arylamines, 3-methyl-5-pyrazolone, 1 - phenyl - 3-methyl-5-pyrazolone and the heteroyclic ketaldazines, especially those represented by the formula:

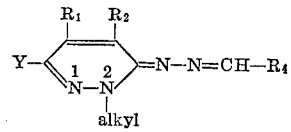

in which Y, $R_1$ and $R_2$ have the significance indicated above and $R_4$ represents a hydrogen atom or a lower alkyl group. In the case where the coupling compound AH is phenolic or enolic in nature, X is bonded to A and represents the oxygen atom of the phenolic or enolic radical.

The hydrazones of Formula II which are new products may be prepared for example by the action of hydrazine hydrate on pyridazinium salts of the formula:

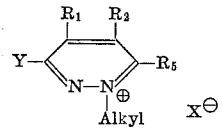

in which $R_5$ represents a chlorine or bromine atom, or an alkoxy, phenoxy or alkylthio group.

The dyestuffs of Formula I possess the tinctorial properties of basic dyestuffs and are particularly suitable for dyeing fibres based on polymers or copolymers of acrylonitrile to which they give generally bright and full-bodied shades endowed with excelent fastness, especially to light.

The invention will be more clearly understood by reference to the following examples which are purely illustrative and in which the parts are parts by weight unless the contrary is indicated.

Example 1

(a) 1.35 parts of 6 - chloro - 2-methyl-3-pyridazone-hydrazone hydrochloride are dissolved in 50 parts of water, and then 1.5 parts of α-picoline, 3-parts of acetic acid and 1.1 parts of 76.8% N-monoacetyl-m-phenylenediamine are added. Then a solution of 0.8 part of 80% sodium chlorite in 10 parts of water is introduced, with stirring, into the mixture maintained at 20° C. Stirring is continued for 6 hours at 20° C., then the dyestuff is precipitated by adding 12 parts of sodium chloride. The dyestuff is isolated by filtration, washed with a 30% solution of sodium chloride and dried. (Weight: 1.7 parts.) It is soluble in water and dyes polyacrylic fibres in a red shade fast to light.

(b) The 6 - chloro - 2-methyl-3-pyridazone-hydrazone hydrochloride is prepared in the following way: a mixture of 14.5 parts of 3,6-dichloro-pyradazine, 50 parts by volume of chlorobenzene and 13 parts by volume of methyl sulphate is heated for one hour. The quaternary ammonium salt formed is extracted twice with 70 parts of water altogether. This aqueous solution is filtered and poured into a solution at 5° C. of 20 parts by volume of hydrazine hydrate in 20 parts of water. The mixture is stirred for two hours at 5° C. and extracted with chloroform. Then a stream of gaseous hydrochloric acid is passed into the chloroform solution. The solvent is evaporated and leaves the hydrazone hydrochloride. Dry weight: 8 parts.

Example 2

(a) 21.1 parts of 90% 6-methoxy-2-methyl-3-pyridazone hydrochloride are dissolved in 500 parts of water. 16 parts of N-diethylaniline are added and then 40 parts of glacial acetic acid and 20 parts of α-picoline.

In order to assist the oxidising condensation, 0.2 part of Mohr's salt is added and a solution of 16 parts of commercial sodium chlorite in 200 parts of water is introduced in a period of 6 hours, the temperature being maintained at 20° C. The mixture is stirred during the oxidation.

The dyestuff is precipitated by adding successively 80 parts of sodium chloride and 50 parts of a 20% solution of zinc chloride. The precipitate is collected by filtration, washed on the filter with a 30% solution of sodium chloride, and then dried. The yield by weight is 36 parts. This dyestuff dyes acrylic fibres in a violet shade fast to light.

(b) 6 - methoxy - 2 - methyl-3-pyridazone-hydrazone hydrochloride is prepared in the following way. 140 parts of 3,6 - dimethoxy-pyridazine are dissolved in 300 parts of chloroform and 130 parts by volume of methyl sulphate are gradually added to the mixture brought to the boil. Boiling is continued for three quarters of an hour. The quaternary ammonium salt is extracted with water from the reaction mass cooled to 20° C. and this aqueous solution is poured, while stirring, into a solution at 5° C. of 300 parts of hydrazine hydrate in 300 parts of water. After reacting for two hours at 5° C., the hydrazone is extracted with chloroform. A stream of hydrochloric acid is passed into the chloroform solution, which then leaves, by evaporation, the hydrazone hydrochloride. Dry weight: 92 parts.

On replacing the N-diethylaniline in Example 2 by the amines enumerated in Table I below, other dyestuffs can be obtained with the 6-methoxy-2-methyl-3-pyridazone-hydrazone, which possess similar tinctorial properties.

TABLE I

| Example | Coupling compound | Shades on acrylic fibres |
|---|---|---|
| 3 | N-acetyl-m-phenylenediamine | Red. |
| 4 | 3-methoxy-N-diethylaniline | Ruby. |
| 5 | N-dimethyl-α-naphthylamine | Blue. |
| 6 | 3-acetylamino-N-diethylaniline | Purple. |
| 7 | 2,5-dimethoxy-N-dimethylaniline | Red violet. |
| 8 | 2,5-diethoxy-N-diethylaniline | Do. |
| 9 | 2-methoxy-5-methyl-dimethylaniline | Violet. |

Example 10

(a) 1.8 parts of 6 - phenoxy-2-methyl-3-pyridazone-hydrazone hydrochloride are dissolved at 20° C. in 150 parts of water and 1.1 parts of N-acetyl-m-phenylenediamine hydrochloride are added, then 3 parts of acetic acid and 2 parts of α-picoline. A solution of 0.8 part of commercial sodium chlorite in 10 parts of water is introduced in a period of one hour. When the introduction of the sodium chlorite is ended, the mixture is then stirred for 16 hours at ordinary temperature. The dyestuff is precipitated by adding 10 parts of sodium chloride. The dyestuff is filtered off, washed with a 15% solution of sodium chloride and dried. Dry weight: 2.3 parts.

(b) The 6 - phenoxy - 2 - methyl-3-pyridazone-hydrazone hydrochloride is prepared in the following way: 26 parts by volume of methyl sulphate are added with stirring in a period of a quarter of an hour to a solution of 52.8 parts of 3,6-diphenoxy-pyridazine in 100 parts of chlorobenzene heated to 90° C., and the mixture is heated at 90° C. for three quarters of an hour. The quaternary ammonium salt formed is filtered off, dissolved in 200 parts of water and this solution is poured into a solution at 5° C. of 60 parts of hydrazine hydrate in 60 parts of water. The mixture is allowed to react for two hours at 5° C. and the hydrazone is isolated by filtration. It is washed with water and dissolved in 500 parts of water cooled to 10° C. A solution of concentrated hydrochloric acid is added until an acid reaction is obtained with Congo red paper. After this solution has been filtered, 100 parts of sodium chloride are added. The hydrazone hydrochloride is precipitated, and it is isolated by filtering and dried. Dry weight: 21 parts.

On replacing the N-acetyl-m-phenylenediamine in Example 10 by the amines in Table II below, dyestuffs possessing similar tinctorial properties are obtained with the 6 - phenoxy-2-methyl-3-pyridazone-hydrazone hydrochloride.

TABLE II

| Example | Coupling compound | Shade on acrylic fibres |
|---|---|---|
| 11 | N-diethyl-m-anisidine | Red. |
| 12 | N-dimethyl-α-naphthylamine | Blue. |
| 13 | 2,5-dimethoxy-N-diethylaniline | Bordeaux. |

Example 14

(a) 1.1 parts of 6 - isopropyloxy - 2-methyl-3-pyridazone-hydrazone hydrochloride are dissolved in 150 parts of water. 2 parts of acetic acid and 1 part of α-picoline are added, and then 0.9 part of N-diethyl-m-anisidine. Then a solution of 0.8 part of sodium chlorite in 10 parts of water is introduced into the mixture maintained at 20° C. The oxidation reaction is carried out for 6 hours at 20° C. The dyestuff is precipitated by adding 35 parts of sodium chloride and 5 parts by volume of a 20% solution of zinc chloride. The dyestuff is isolated by filtration, washed with a 5% aqueous solution of sodium chloride and dried at 50° C. under reduced pressure. It dyes polyacrylic fibres in a purple shade.

(b) The hydrazone hydrochloride required for its preparation may be obtained from 6-isopropyloxy-3-chloropyridazine by the method of operation described in Example 1.

We claim:
1. Dyestuffs having one of the general formulae:

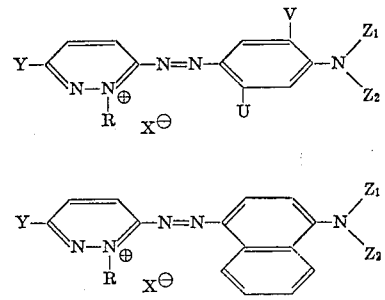

and

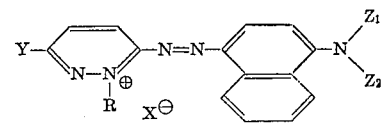

in which Y represents a member selected from the group consisting of chlorine and bromine atoms, the phenoxy group, and alkoxy groups having up to 3 carbon atoms, R is a member selected from the group consisting of the methyl and ethyl groups, $X^{\ominus}$ represents a monovalent anion, $Z_1$ and $Z_2$ each represent a member selected from the group consisting of the hydrogen atom and the methyl and ethyl groups, U represents a member selected from the group consisting of the hydrogen atom and the methyl, methoxy, ethoxy and acetylamino groups, and V represents a member selected from the group consisting of the hydrogen atom and the methoxy and ethoxy groups.

2. Dyestuffs according to claim 1 in which Y represents methoxy.

3. Dyestuffs according to claim 1 in which Y represents isopropyloxy.

References Cited

UNITED STATES PATENTS 3,216,995  11/1965  Baumann et al. _____ 260—157

CHARLES B. PARKER, *Primary Examiner.*

D. M. PAPUGA, *Assistant Examiner.*